Figure 3:
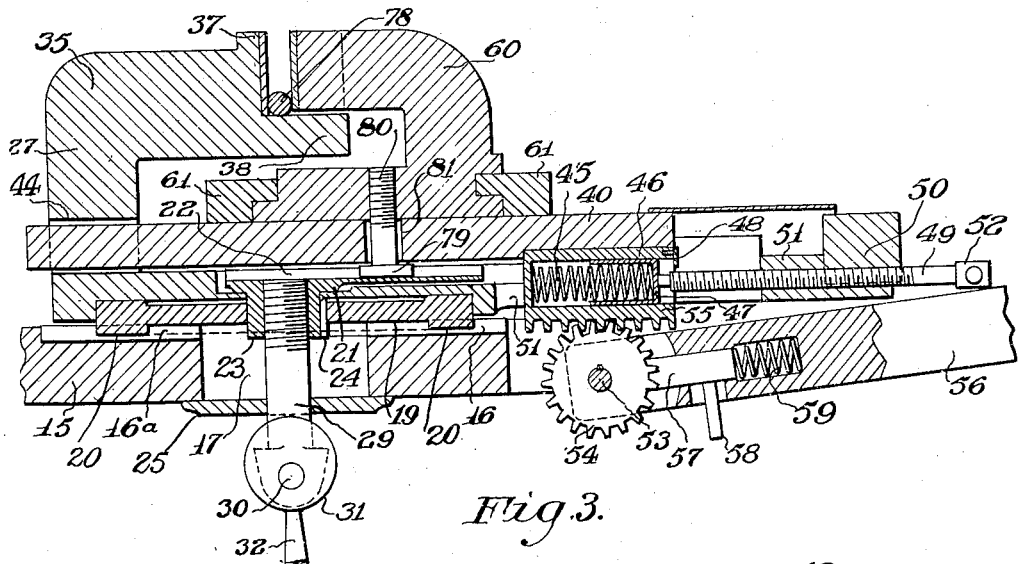

Feb. 19, 1935.   T. H. GORDON   1,992,147
WORKHOLDER
Filed March 1, 1933   2 Sheets-Sheet 1
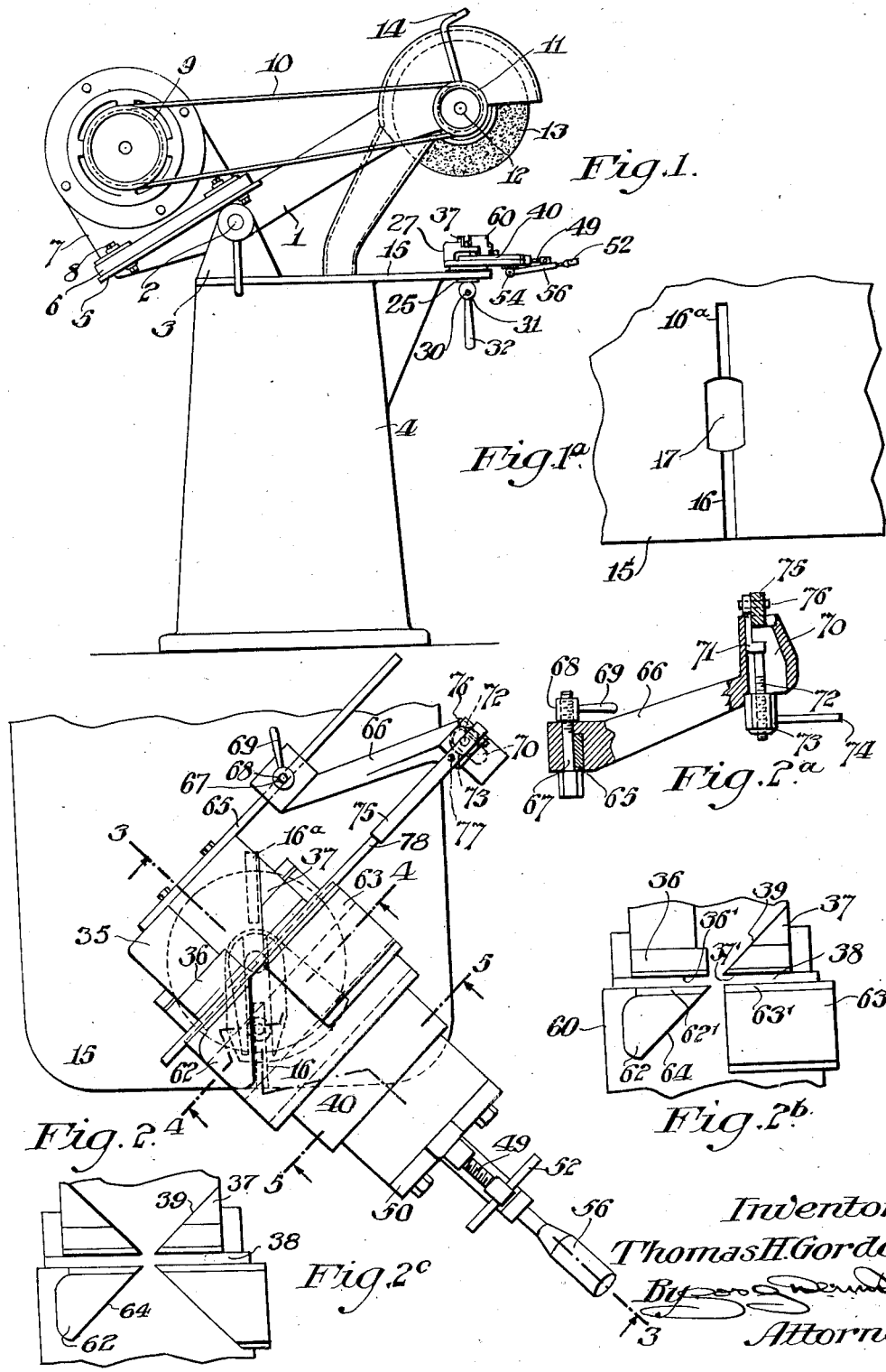
Inventor:
Thomas H. Gordon,
By
Attorney.

Feb. 19, 1935.  T. H. GORDON  1,992,147
WORKHOLDER
Filed March 1, 1933   2 Sheets-Sheet 2

Inventor:
Thomas H. Gordon,
By [signature]
Attorney.

Patented Feb. 19, 1935

1,992,147

UNITED STATES PATENT OFFICE 1,992,147

WORKHOLDER

Thomas H. Gordon, Philadelphia, Pa., assignor to Albert P. de Sanno, Jr., Philadelphia, Pa.

Application March 1, 1933, Serial No. 659,100

15 Claims. (Cl. 51—217)

My invention is a work holder designed to support work on both sides of and at desired angles to a tool and in close juxtaposition thereto, and is particularly applicable to a cut-off machine having an abrasive disk of brittle material movable in a fixed plane and which is likely to be broken by back lash of work when cutting thereof is completed.

By my improvements, clamping jaws may be spaced from one another longitudinally of the work distances just sufficient to give desired clearance between the pairs of complementary jaws for the passage of the cutter or tool, and such positioning is automatically maintained notwithstanding movement of the work holder about an axis to present work to the tool at desired angles. Consequently work may be presented at any desired angle while firmly supported close to and on both sides of the cut being made, and back lash thereby obviated.

My improvements further provide for the exertion of a desired uniform thrust on a clamping jaw on each side of the cutter and for simultaneous momentary retraction of such jaws to permit shifting of the work in any position of the workholder.

A further object of my improvements is the provision of an adjustable stop for limiting the movement of the work in any position of the work holder.

In its preferred embodiment, my invention comprises a base having a jaw-support mounted rotatably relatively thereto and to the plane of a cutter movable vertically on a fulcrumed arm. The rotatable support has fixed thereto a pair of jaw blocks having the edges of their clamping faces spaced just sufficiently for the desired clearance of the cutter. One or both of the jaw blocks has a face adjacent to the plane of the wheel forming an acute angle with the clamping face of the block so as to permit rotation of the jaw-blocks together about an axis in one or both directions from the plane of the cutter without causing a jaw block to impinge against a side of the cutter.

The rotatable support also carries a slide reciprocable thereon under the thrust of a spring and retractible by a pawl and ratchet mechanism against the action of the spring. A second slide is mounted on and movable transversely to the first slide by the action of a roller depending therefrom and engaging a guide upon the rotation of the support. The guide also serves as a clamp to secure the support against the base when the support has been adjusted to desired position.

The second slide carries a pair of jaw blocks having clamping faces with edges spaced sufficiently for the clearance of the cutter, and complementary to the clamping faces of the first named jaw blocks. One or both of the jaw blocks carried by the slide is provided with a face forming an acute angle with the clamping face of the block so as to permit movement of the jaws together about an axis in one or both directions from the plane of the cutter without impinging against the cutter when the work holder is moved so as to present work at an angle to the wheel; the second slide being automatically moved laterally to maintain a line intersecting the gaps between both sets of jaws in alignment with the cutter in any position of the work holder.

Figure 4:
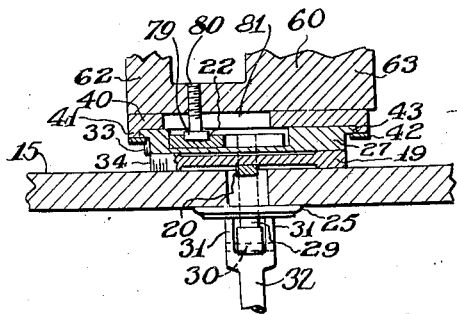
Figure 5:
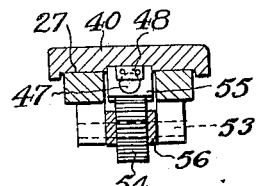
Figure 6:
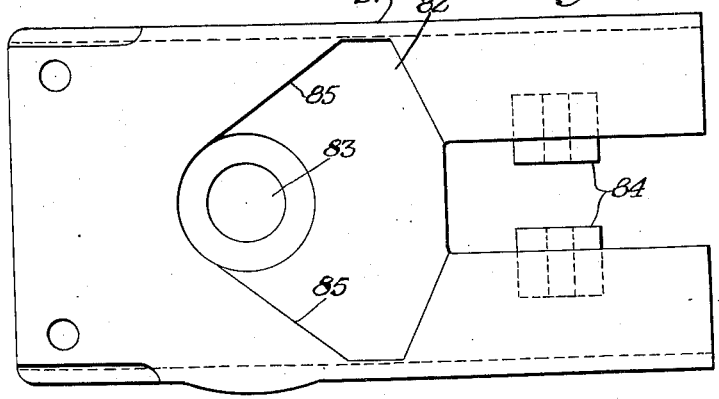

The characteristic features and advantages of my improvements will further appear from the following description and the accompanying drawings in illustration of a preferred embodiment of my invention:

In the drawings Fig. 1 is a side elevation of a cut-off machine having my improvements applied thereto; Fig. 1a is a fragmentary plan view of the table top of the cut-off machine with the work holder removed; Fig. 2 is a fragmentary top plan view of the table of the cut-off machine with my improved work holder disposed to hold the work at a 45° angle to the line of cut; Fig. 2a is a part sectional elevation of a work gauge; Fig. 2b is a fragmentary detached top plan view of the work engaging jaws; Fig. 2c is a fragmentary detached top plan view of a modified set of jaws permitting the work holder to be swung in either direction from the center; Fig. 3 is an enlarged longitudinal sectional view through the work holder on the irregular line 3—3 of Fig. 2; Fig. 4 is an irregular fragmentary sectional view of the work holder approximately on the line 4—4 of Fig. 2; Fig. 5 is a transverse sectional view of the work holder on the line 5—5 of Fig. 2; Fig. 6 is an enlarged detached plan view of a revoluble carriage having a recess permitting adjustment of the work holder in either direction from the center.

In the drawings, my improvements are illustrated as applied to a cut-off machine which per se is not of my invention and comprises a lever or table 1 provided with trunnions 2 journalled in bearings 3 of a base 4 and providing a slideway 5 for the base plate 6 of an electric motor 7. The base plate 6 may be adjustably clamped to the slideway 5 by bolts 8 passing through elongated slots in the working table 1. The motor shaft has fixed thereon a pulley 9 containing grooves for the engagement of V-shaped transmission belts 10 which are engaged in grooves of a pulley 11 fixed on a spindle 12 journalled in a cylindrical housing at the front of the table 1 and having detachably fixed thereto an abrasive cutter disk 13. The cutter preferably consists of a thin brittle disk of oxide of alumina or other abrasive and a binder such as phenolic condensation product and is rotatable at high speed in a fixed plan in which the disk is reciprocable by rocking the table 1 by means of a handle 14.

In accordance with my improvements, the shelf 15 projecting from the top of the base 4 is provided with depressed keyways 16—16a spaced by the elongated aperture 17. A circular disk or bed plate 19 rests on the shelf 15 and is provided with a key 20 in the ways 16—16a so as to prevent rotation of the bed plate while permitting adjustment thereof in a plane parallel to the plane of the cut-off wheel. A guide 21 containing a slot 22 extending parallel with the cutting plane has depending therefrom a hub 23 which is keyed to the bed plate 19 by a key 24. A carriage 27 is rotatably mounted on the bed plate 19 and has fixed thereto a bolt 29 threaded into the hub 23. A spindle 30 is journalled in the bottom of the bolt 29 and has fixed thereto eccentrically mounted discs 31 to which is fixed a handle 32. By rocking the handle 32 the cam surfaces of the eccentric discs 31 are caused to bear against the washer 25 and clamp the carriage 27 in any desired position relative to the bed plate. A pointer 33 on the carriage co-acts with a scale 34 on the bed plate to indicate the angular position of the carriage relative to the plane of cut.

The carriage 27 has upwardly projecting member 35 having thereon the forwardly projecting clamping jaws 36 and 37 and lip or ledge 38 on which work may be rested. The adjacent edges of the clamping faces 36', 37' of the jaws 36, 37, are spaced only sufficiently to give desired clearance to the cutter, and the face 39 of the jaw 37 is inclined at an acute angle (preferably 47°) to the face 37', so as to avoid engagement of the jaw 37 with the face of the cutter when the carriage 27 is rotated toward the right as shown in Fig. 2.

A reciprocable slide 40 is mounted on the table 27 and provided with depending flanges 41 and inturned lips 42 for engaging the guideways 43 of the carriage 27. The carriage 27 has an aperture 44 at the rear thereof for the passage of the slide 40 which is thrust inward by a spring 45 and a clip 48 prevents the ejection of the cap or spring from the sleeve 46 which is firmly fixed to the slide 40. The spring is placed under compression to impart thrust to the slide 40 by means of a screw 49 having its end bearing against the end of the cap 47 and its shank threaded in a bearing 50 fixed to the forwardly projecting arms 51 of the carriage 27. A handle 52 on the end of the screw 49 facilitates the rotation thereof to compress or release the spring. A shaft 53 is supported by the arms 51 and has journalled thereon a pinion 54 meshing with the rack teeth 55 on the sleeve 46. A bifuracted handle 56 is journalled on the shaft 53 and contains a plunger 57 having a nose adapted to engage the teeth of the pinion 54 and a trigger 58 by which the nose can be retracted against the resistance of the spring 59 to disengage the handle 56 from the pinion.

A slide 60 is reciprocable transversely to the direction of movement of the slide 40 in the slideways 61 mounted upon the latter. The slide 60 has thereon jaws 62, 63 projecting over the ledge 38 and having clamping faces 62', 63' parallel with and complementary to the clamping faces 36', 37' of the jaws 36 and 37. The face 64 of the jaw 63 is disposed at an angle (preferably 47°) to the face 62' thereof so that the jaw 62 will not impinge upon the wheel 12 when the workholder is shifted toward the right as illustrated in Fig. 2.

The member 35 has bolted thereto a rod 65 on which slides a bracket 66 which may be clamped to the rod 65 by means of the bolt 67 and nut 68 provided with a handle 69. The opposite end of the arm or bracket 66 contains an oval aperture 70 in which is disposed a bracket 71 having a rotating shank 72 engaged by the nut 73 on the handle 74 to permit the adjustment of the bracket in the oval aperture 70. A gauge bar 75 is pivoted on the pintle 76 fixed in the arm 66 and an adjusting screw 77 threaded in the bar 75 engages the arm 66 at the side of the aperture 70 so as to adjust the bar 75 vertically.

In the modified structure illustrated in Fig. 2c, the clamp jaws 36 and 63, as well as the clamp jaws 37 and 62, are provided with sloping rear surfaces. When such jaws are used there is preferably substituted for the carriage 27 a carriage 27a as shown in Fig. 6. This carriage 27a contains a recess 82 having diverging edges symmetrically disposed relatively to an aperture 83 for the passage of a bolt 29 and hub 23. The carriage 27a is provided with depending bearings 84 in which is journalled a shaft similar to the shaft 53.

In operation, the bed plate 19 is normally held in position, along the ways 16—16a, by clamping action of the eccentric discs 31 against the washer 25; release of these discs, by manipulation of the handle 32, permitting the bed plate 19 and the parts thereon to be adjusted by movement of the keys 20 along the ways 16—16a and of the bolt 29 in the aperture 17, whereupon, by reverse movement of the handle 32, the parts may again be clamped in position.

Releasing the plunger 57 from the teeth of the pinion 54, by manipulation of the handle 58 against the action of the spring 59, permits the pinion 54 to idle on the shaft 53 and the slide 40 to be moved from left to right, or in the opposite direction, as seen in Fig. 3, relative to the bed plate 19; this movement being effected to adjust the clamp jaws against the work objects 78. After such adjustment, the handle 52 is operated to turn the screw 49 in the bearing 50, thereby compressing the spring 45 to effect the desired clamping force. With this adjustment effected, the handle 56 is placed in clamping position and the plunger 57 released.

After this adjustment, when the handle 56 is turned clockwise about the axis of the shaft 53, as seen in Fig. 3, the plunger 57 being locked in the handle and to the pinion 54 turns the latter to move the rack on the sleeve 55 to the right against the action of the spring 46, and consequently to separate the clamp jaws to release the work object.

To turn the carriage 27 about its vertical axis, it is merely necessary to use the handle 56 as a lever in a horizontal plane and, in the form of the invention indicated by Figs. 2 and 2b, this lever movement is only permitted in the counterclockwise direction from the position illustrated. During such movement, a head or roller 79 as seen in Figs. 3 and 4, on a bolt 80 depending from the carriage 27 through a slot 81 in the slide 40 and disposed in the slot 22 of the guide 21, causes the slide 60 to move relative to the slideway 61. Consequently, the surfaces 62', 63' move together to the left, as viewed in Fig. 2b relative to the surfaces 36', 37', thus maintaining the jaws 36, 37 at one side of the work, and the jaws 62, 63 at the other side of the work always the same distance laterally from the vertical plane sides of the cutter or tool disc 13 irrespective of its angle of approach to the work.

The operation of the modification, indicated in Fig. 2c, is similar to that above described, except that the carriage 27a, as shown in Fig. 6, may be turned in a horizontal plane in opposite directions from a central position in which the work object is at right angles to the plane of the disc 13; this action being rendered possible by having sloping rear surfaces on all of the clamp jaws 36, 37 and 62, 63 instead of on only one of each pair thereof, and by vertical surfaces 85 of a recess 82 symmetrically disposed at opposite sides of a front-to-back center line for limiting movement of the carriage relative to the guide 21. In the first form, one of the surfaces 85 is disposed toward the center line to prevent movement of the carriage 27a relative to the guide 21, in one direction from such center.

As indicated in Figs. 2 and 2a, the gauge bar 75 is adjusted longitudinally of the work object 78 against its adjacent end by manipulation of the handle 69 and moving the bracket 66 along the rod 65. The bar 75 is adjusted vertically about its pivot pin 76, by the screw 77, and in the direction of its pivot axis by manipulation of the handle 74, thus providing means for accurately positioning between the clamp jaws work objects of various sizes and shapes.

Having described my invention, I claim:

1. An apparatus of the character described, a work holder movable about an axis and comprising a plurality of pairs of clamping jaws, and means for moving laterally a jaw during the movement of said workholder about its axis.

2. In apparatus of the character described, a work holder movable about an axis and comprising a plurality of pairs of clamping jaws, and means for moving a plurality of said jaws laterally during the movement of said work holder about its axis.

3. In apparatus of the character described, a work holder movable about an axis and comprising a plurality of pairs of jaw bodies having complementary clamping faces, a plurality of said jaw bodies each having a face forming an acute angle with its clamping face, and means for moving a plurality of said jaw bodies laterally during the movement of said workholder on its axis.

4. In apparatus of the character described, a work holder movable about an axis and comprising a plurality of clamping jaws, and means for simultaneously moving a pair of said jaws laterally without varying the distance between them during the movement of said work holder about its axis.

5. In apparatus of the character described, a pair of jaws movable together about an axis, a slide movable laterally with respect to said jaws, means comprising a guide for deflecting said slide laterally upon the movement of said jaws about their axes, and a pair of jaws mounted on said slide and complementary to said first named jaws.

6. In apparatus of the character described, a work-holder comprising a pair of jaws, means normally pressing said jaws toward each other, means for varying the pressure of said pressure means, and means for separating the jaws against the pressure of the pressure means.

7. In apparatus of the character described, a pair of laterally spaced jaws, a second pair of laterally spaced jaws having the space opposite the space between the first jaws, means normally pressing said second named pair of jaws toward said first named pair of jaws, means for varying the pressure on said second named pair of jaws, and means for shifting said second named jaws laterally with respect to said first named pair of jaws.

8. In apparatus of the character described, a work-holder comprising a pair of jaws, means for pressing one of said jaws toward the other jaw, means for varying the pressure of the pressure means, and means comprising a pawl and a ratchet operable in concert for retracting said last named jaw and having relative movement effective during operation of said pressure-varying means.

9. In apparatus of the character described, a work-holder comprising a clamping jaw, a support for said jaw rotatable about an axis, a slide movable on said support, means pressing said slide toward said jaw, means independent of said means first named for retracting said slide, a second slide movable on said first named slide, a guide for deflecting said second named slide during the movement of said support about its axis and a jaw carried by said second named slide and complementary to said first named jaw.

10. In apparatus of the character described the combination with a cutter movable in a fixed plane of a work holder movable about an axis for supporting work in the plane of said wheel, said work holder comprising a pair of clamping jaws on each side of the plane of said cutter, means for moving laterally jaws on opposite sides of the plane of said wheel, during the movement of said work-holder about its axis.

11. In apparatus of the character described, a work-holder movable about an axis comprising a pair of jaws, means for pressing one of said jaws toward the other, means independent of the means first named for retracting said last named jaw and an adjustable abutment carried by said work-holder for limiting the movement of work when said jaw is retracted in any position of said workholder.

12. In apparatus of the character described, a work-holder comprising a pair of jaws, a support therefor movable about an axis, a base on which said support is movable, a slide reciprocable on said support, a second slide movable on said first named slide, jaws mounted on said second named slide, and a guide member for deflecting said second named slide during the movement of said support and for clamping said support to said base.

13. In combination, a disc tool rotatable about an axis normal to its plane, work-holding clamp members each including spaced shoulders for position at one side of a work object opposite that of the other, the disc being movable in its plane to position in a space between shoulders of the respective clamp members closely adjacent to the disc at one side thereof, and other shoulders of the respective clamp members closely adjacent to the disc at the other side thereof, and means for simultaneously moving the clamping members about an axis parallel to the plane of the disc and relatively moving shoulders at opposite sides of the disc laterally to the plane of the disc to maintain the spacing thereof relative to the disc.

14. In combination, a tool, work-holding clamp members, said tool and members being movable relatively to one another for angularly positioning a work-object relatively to the tool and for bringing the object and tool together, the members of said work-holding clamp having clamping faces one of which is movable toward the other and one of which is movable in a direction parallel with the clamping faces in accordance with the relative positions of the tool and work-object, and means for effecting said relative movements between said clamp members and holding them in position.

15. In combination, a tool, work holding clamp members, said tool and members being movable relatively to one another for angularly positioning a work-object relatively to the tool and for bringing the object and tool together, the members of said work-holding clamp having clamping faces one of which is movable toward the other and one of which is movable in a direction parallel with the clamping faces, and means responsive to relative angular movement of the tool and members for moving said last named clamping face in a direction parallel with the clamping faces.

THOMAS H. GORDON.